(12) United States Patent
Kim

(10) Patent No.: US 9,258,740 B2
(45) Date of Patent: Feb. 9, 2016

(54) PUSH SERVICE PROVIDING SYSTEM AND METHOD FOR BALANCING MESSAGE LOADS

(71) Applicant: SK TELECOM CO., LTD., Seoul (KR)

(72) Inventor: Jin Goog Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 109 days.

(21) Appl. No.: 14/107,829

(22) Filed: Dec. 16, 2013

(65) Prior Publication Data

US 2014/0106796 A1 Apr. 17, 2014

Related U.S. Application Data

(63) Continuation of application No. PCT/KR2012/005155, filed on Jun. 29, 2012.

(30) Foreign Application Priority Data

Jul. 19, 2011 (KR) .......................... 10-2011-0071435

(51) Int. Cl.
| | |
|---|---|
| *H04W 4/00* | (2009.01) |
| *H04W 28/08* | (2009.01) |
| *H04L 29/08* | (2006.01) |
| *H04W 4/12* | (2009.01) |
| *H04J 3/06* | (2006.01) |

(52) U.S. Cl.
CPC ............. *H04W 28/08* (2013.01); *H04L 67/145* (2013.01); *H04L 67/26* (2013.01); *H04W 4/12* (2013.01)

(58) Field of Classification Search
CPC ..................................................... H04W 4/00

USPC .......................................................... 455/466
See application file for complete search history.

(56) References Cited

U.S. PATENT DOCUMENTS

2009/0319670 A1* 12/2009 Kang ............................ 709/227
2010/0322124 A1* 12/2010 Luoma et al. ................. 370/311

FOREIGN PATENT DOCUMENTS

| KR | 100333741 B1 | 4/2002 |
| KR | 1020090065691 A | 6/2009 |
| KR | 1020100000576 A | 1/2010 |
| KR | 100992332 B1 | 11/2010 |

OTHER PUBLICATIONS

International Search Report mailed Dec. 26, 2012, 2012 for PCT/KR2012/005155.

* cited by examiner

*Primary Examiner* — Huy C Ho
(74) *Attorney, Agent, or Firm* — Hauptman Ham, LLP

(57) ABSTRACT

A push service device for balancing message loads includes: a service provider (SP) interworking unit to connect with a service providing device; a controller to route a push message received from the service providing device through the SP interworking unit to one or more corresponding client devices; and a client interworking unit to transmit the push message transferred from the controller to the one or more corresponding client devices, to receive a keep-alive message from at least one of the one or more corresponding client devices, and to transmit a keep-alive configuration message to the one or more corresponding client devices to disperse reception time points of the keep-alive message for a predetermined transmission period of the keep-alive message when the reception time points of the received keep-alive message are synchronized.

17 Claims, 6 Drawing Sheets

PUSH SERVICE PROVIDING SYSTEM AND METHOD FOR BALANCING MESSAGE LOADS

CROSS-REFERENCE TO RELATED APPLICATION

The present application is a continuation of International Application No. PCT/KR2012/005155 filed on Jun. 29, 2012, which is based on, and claims priority from, KR Application Serial Number 10-2011-0071435, filed on Jul. 19, 2011. The disclosures of the above-listed applications are hereby incorporated by reference herein in their entirety.

FIELD

The present disclosure relates to a push service providing system and method for balancing message loads, in which keep-alive messages which client devices transmit are distributed.

BACKGROUND

The statements in this section merely provide background information related to the present disclosure and do not constitute prior art.

As smart phones have come into wide use, and various applications have appeared due to the smart phone environment, the use of wireless resources is greatly increasing. In particular, always-on type applications, such as an Instant Messaging (IM) service, a Web service, and a Widget service, which always connect with a network in order to receive a push message or a push notification in real time are rapidly increasing. Since the always-on type applications are preparing to receive a push service while maintaining connections with service providers, the inventor(s) has experienced that excessive traffic is caused, and batteries are rapidly exhausted.

A push server according to the related art has adopted a method in which a service provider and a client are not directly connected, and when the service provider maintaining connection with the push server through a daemon constructed in the client transmits a push message or a push notification, the intermediary push server receives and transmits it to the corresponding client.

SUMMARY

In accordance with some embodiments, a push service device for balancing message loads comprises a service provider (SP) interworking unit, a controller, and a client interworking unit. The service provider (SP) interworking unit is configured to connect with a service providing device. The controller is configured to route a push message received from the service providing device through the SP interworking unit to one or more corresponding client devices. And the client interworking unit is configured to transmit the push message transferred from the controller to the one or more corresponding client devices, receive a keep-alive message from at least one of the one or more corresponding client devices, and transmit a keep-alive configuration message to the one or more corresponding client devices to disperse reception time points of the keep-alive message for a predetermined transmission period of the keep-alive message when the reception time points of the received keep-alive message are synchronized.

In accordance with some embodiments, a push service device is configured to transmit a push message received from a service providing device to one or more corresponding client devices; receive a keep-alive message from the one or more corresponding client devices; determine whether or not reception time points of the received keep-alive message are synchronized; and transmit a keep-alive configuration message to the one or more corresponding client devices to disperse the reception time points of the keep-alive message for a predetermined transmission period of the keep-alive message when the reception time points of the keep-alive message are synchronized.

In accordance with some embodiments, a client device of providing a push service with balanced message loads is configured to determine a transmission period timer of a keep-alive message, and transmit the keep-alive message to a push service device when a time limit of the transmission period timer expires; receive a keep-alive configuration message from the push service device to disperse transmission time points of the keep-alive message within a predetermined transmission period; and initialize the transmission period timer of the keep-alive message according to reception of the keep-alive configuration message. The client device is configured to transmitting the keep-alive message to the push service device when a time limit of the initialized transmission period timer expires.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
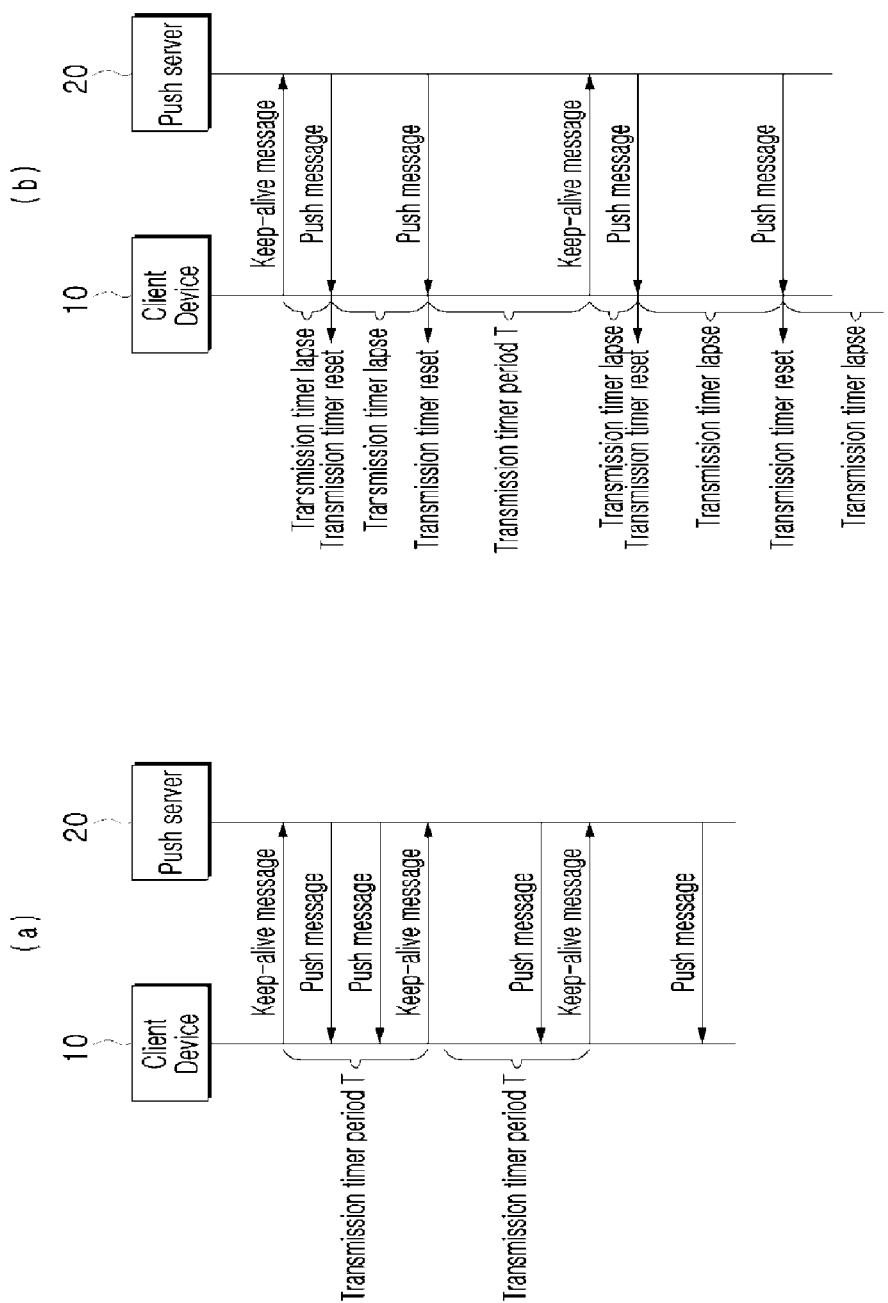
FIGS. 1A and 1B are signal flow diagrams of transmission processes of keep-alive messages in a push service system.

Hereinafter, embodiments of the present disclosure will be described in detail with reference to the accompanying drawings. The configuration and the corresponding effect of the present disclosure will be clearly understood from the following detailed description. Prior to the detailed description of the present disclosure, it is noted that although shown in different drawings, the same elements are provided with the same reference numerals in the drawings, and detailed descriptions related to well-known functions or configurations will be omitted when they makes subject matters of the present disclosure obscure.

FIGS. 1A and 1B are signal flow diagrams showing transmission processes of keep-alive messages in a push service system.

The inventor(s) has noted that an always-on type application maintains a connection with a service provider through a client. In order to maintain the connection, the client device 10 transmits presence information of the application to a push server 20 through keep-alive messages, and the push server 20 receives the keep-alive messages to identify the presence information of the application.

In general, the keep-alive messages are transmitted from the client device 10 installed in a terminal to the push server 20. The client device 10 transmits the keep-alive messages to the push server 20 according to a predetermined period. The keep-alive messages are necessary for identifying the presence information of the application. Due to this, a transmission period of the keep-alive messages is generally set as shortly as possible.

Transmission of the keep-alive messages will be described with reference to FIGS. 1A and 1B.

As an example, a transmission period timer for transmission of the keep-alive messages is initialized when an event such as push message reception occurs in the client device 10 of a terminal side. FIG. 1B shows a case in which the client device 10 transmits the keep-alive messages when a time limit of the initialized transmission period timer is expired.

As another example, the client device 10 transmits keep-alive messages irrespective of the event such as the push message reception. FIG. 1A shows a case in which, in the process of receiving the push message, keep-alive messages are transmitted whenever a time limit of a predetermined transmission period timer is expired.

Figure 2:
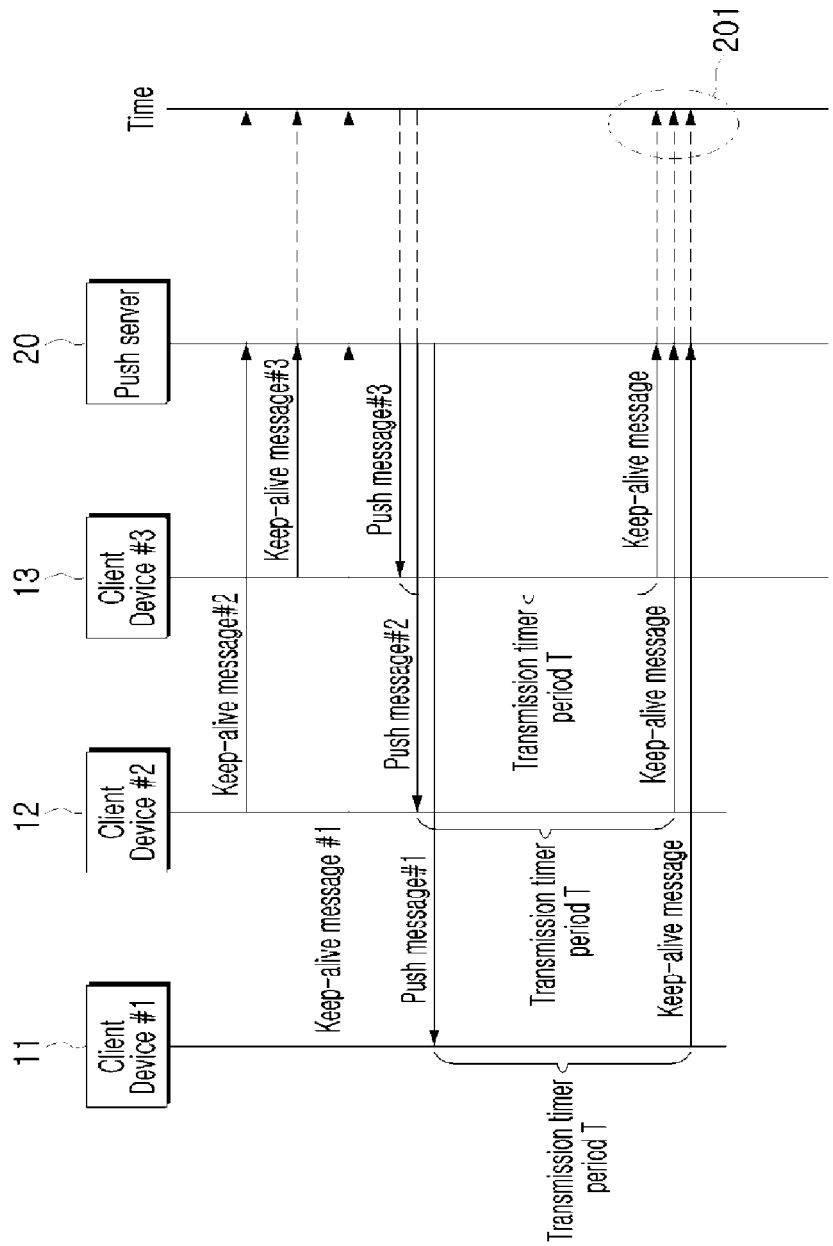
FIG. 2 is a signal flow diagram of a synchronization phenomenon of keep-alive messages.

FIG. 2 is a signal flow diagram showing a synchronization phenomenon of keep-alive messages.

A case in which keep-alive messages are transmitted from a plurality of client devices #1, #2, and #3 (11, 12, and 13) to a push server 20 will be described hereinafter with reference to FIG. 2.

As described above, timers of the plurality of client devices #1, #2, and #3 (11, 12, and 13) are initialized when an event occurs (for example, when a push message is received, or when keep-alive messages are transmitted/received). In a general case, the plurality of client devices #1, #2, and #3 (11, 12, and 13) transmit keep-alive messages #1, #2, and #3 to the push server 20 at different time points after a transmission period timer T passes. Keep-alive periods of terminals are generally identical in the same network.

The inventor(s), however, has noted that due to a phenomenon in which the timers are initialized when a specific event occurs, the plurality of client devices #1, #2, and #3 (11, 12, and 13) intensively receive the push messages #1, #2, and #3 at a time when the push messages are maximally transmitted and received (for example, closing time, and rush hour). After the timers are initialized due to the push message reception, and the transmission period timer T passes, the plurality of client devices #1, #2, and #3 (11, 12, and 13) transmit the keep-alive messages to the push server 20 based on that. The inventor(s) also has noted that due to this, a synchronization phenomenon 201 in which the keep-alive messages are synchronized with each other occurs. The inventor(s) has noted that Burst traffic occurs in the network due to the intensive keep-alive messages. The inventor(s) has noted that Network overload occurs due to the burst traffic by the keep-alive messages.

Figure 3:
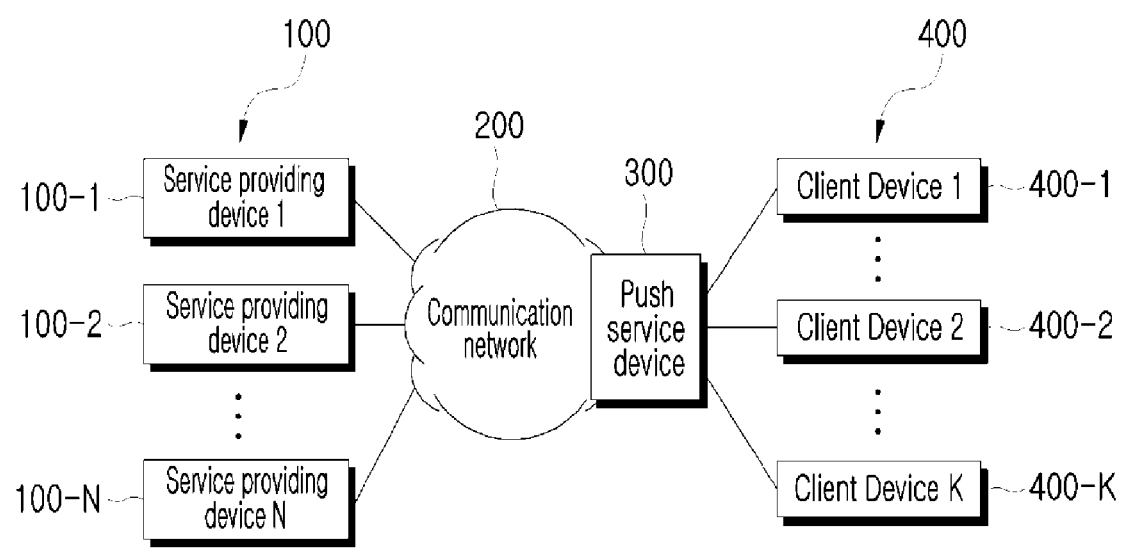
FIG. 3 is a block diagram of a network configuration of a push service providing system for message load balancing according to at least one embodiment of the present disclosure.

FIG. 3 is a block diagram of a network configuration of a push service providing system for message load balancing according to at least one embodiment of the present disclosure.

As shown in FIG. 3, the push service providing system 100 according to at least one embodiment of the present disclosure is configured to include a plurality of service providing devices 100-1 to 100-N (100), a push service device 300, and a plurality of client devices 400-1 to 400-K (400), and is configured to have a structure in which the service providing devices 100 and the client devices 400 are connected with each other through a push service device 300 in the center.

The client devices 400 are terminals capable of connecting with a communication network 200, and for example, is a personal computer, a notebook computer, a smart phone, a Personal Digital Assistant (PDA), a tablet PC, a navigation, a Portable Multimedia Player (PMP), an electronic dictionary, or an MP3 player. The client devices 400 are loaded with client application programs configured to transmit and receive data (especially, push messages, push notifications or the like) through connections with the communication network 200.

The service providing devices 100 refer to servers or terminals configured to transmit push messages to the client devices 400 to provide services.

Basically, the push service device 300 gathers the push messages transmitted from the service providing devices 100, and transfers the push messages to the corresponding client devices 400.

At this time, the push service device 300 is configured to manage interconnections between the service providing devices 100 and the client devices devices 400. The interconnections between the service providing devices 100 and the client devices 400 are maintained by keep-alive messages which the client devices 400 transmits to the push service device 300.

For load balancing of the keep-alive messages, the push service device 300 is configured to detect whether or not transmission time points when the client devices 400 are configured to transmit the keep-alive messages are synchronized. Alternatively, the push service device 300 detects whether or not reception time points of the keep-alive messages received from the client devices 400 are synchronized. Hereinafter, for convenience of description, the push service device 300 detecting whether or not the transmission time points when the client devices 400 transmit the keep-alive messages are synchronized will be described.

When it is determined that the transmission time points of the keep-alive messages received from the client devices 400 have been synchronized, the push service device 300 is configured to uniformly distribute the keep-alive configuration messages for a keep-alive transmission period of an interval T to transmit them to the client devices 400, thereby the transmission time points of the keep-alive messages of the client devices 400 are uniformly distributed for the keep-alive transmission period of the interval T.

Here, the transmission period of the keep-alive messages is set in advance in the client devices 400. The aim is to avoid transmission time synchronization of the keep-alive messages of the client devices 400.

That is, if the push service device 300 uniformly distributes the keep-alive configuration messages to transmit them to the client devices 400 when detecting the synchronization phenomenon, the keep-alive message transmission time points of the client devices 400 are balanced without being synchronized.

In this way, if the keep-alive message transmission time points of the client devices 400 are balanced without being synchronized, as a result, the reception time points of the keep-alive messages of the client devices 400 which the push service device 300 receives are balanced without being synchronized as well.

As an example, when a transmission period of keep-alive messages is T, and N client devices connect with the push service device 300, the push service device 300 is configured to uniformly distribute keep-alive configuration messages according to $((n+1)/N)*T$ for the transmission period of the interval T to transmit them to the N client devices. This uniform distribution will be described in detail with reference to FIG. 5.

The client devices 400 are configured to receive the keep-alive configuration messages from the push service device 300, and initialize the transmission time points of the keep-alive messages at the time of reception. Thus the transmission time points of the keep-alive messages which the client devices 400 transmit are balanced.

Figure 4:
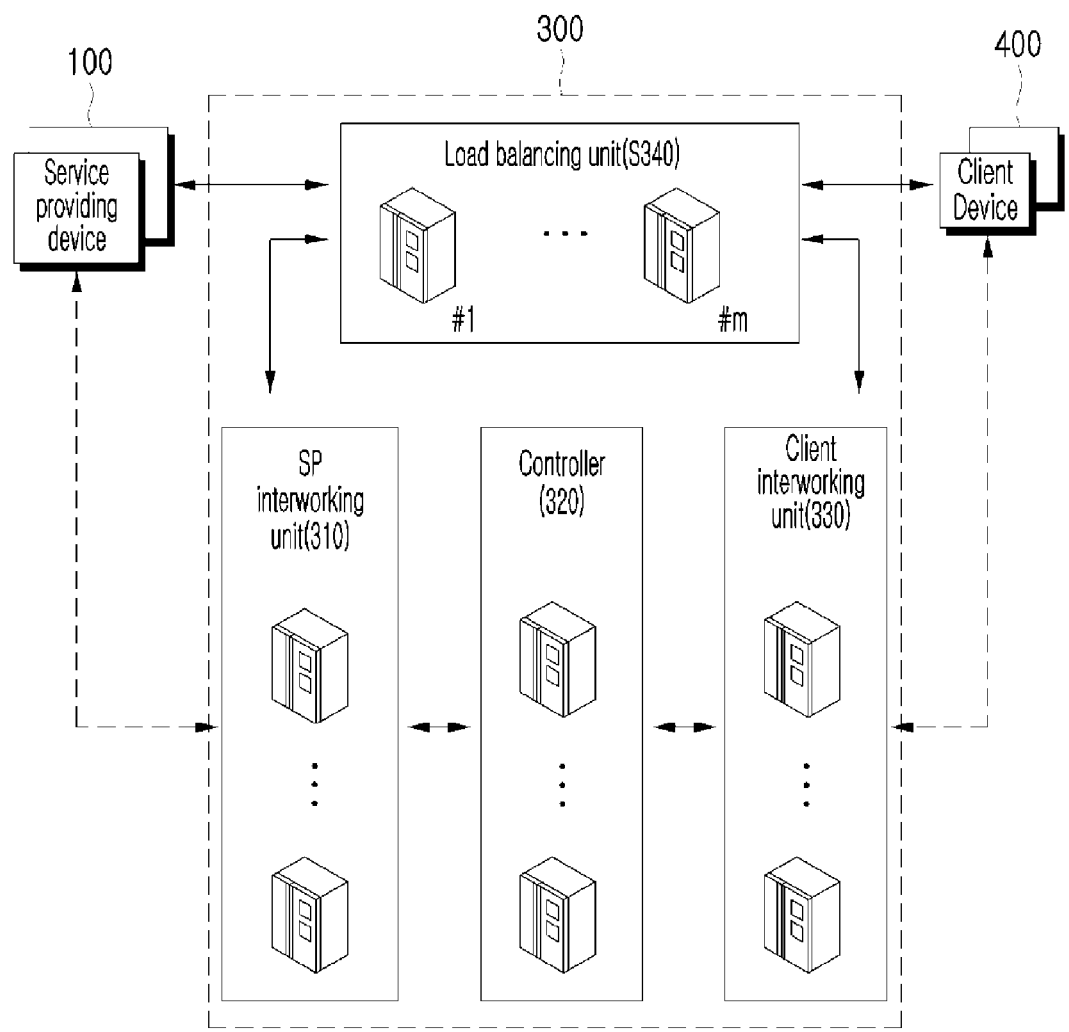
FIG. 4 is a block diagram of a detailed configuration of a push service device for message load balancing according to at least one embodiment of the present disclosure.

FIG. 4 is a block diagram of a detailed configuration of a push service device for message load balancing according to at least one embodiment of the present disclosure.

The push service device 300 according to at least one embodiment of the disclosure includes SP interworking unit 310, controller 320, client interworking unit 330, and load balancing unit 340. Other components of the push service device 300, such as the SP interworking unit 310, the controller 320, the client interworking unit 330, and the load balancing unit 340 are implemented by one or more processors and/or application-specific integrated circuits (ASICs).

The SP interworking unit 310 is configured to connect with a plurality of service providing devices 100, and receive push messages, which will be transmitted to client devices 400, from the service providing devices 100. Here, the push messages include messages which have a property of an official announcement, such as new or updated information and event information.

The client interworking unit 330 is configured to connect with the plurality of client devices 400, and transmit the push messages having been received from the SP interworking units 310 to the plurality of client devices 400.

Moreover, the client interworking unit 330 is configured to connect with the client devices 400 to receive keep-alive messages, and detect whether or not transmission time points when the client devices 400 transmit the keep-alive messages are synchronized. Alternatively, the client interworking units 330 detects whether or not reception time points of the keep-alive messages received from the client devices 400 are synchronized.

For the detection of the synchronization, the client interworking unit 330 is configured to determine whether or not the keep-alive messages which the client devices 400 have transmitted are received over a predetermined number of messages for a predetermined time interval, thereby detect whether or not the transmission time points when the client devices 400 transmit the keep-alive messages, or the reception time points of the keep-alive messages received from the client devices 400 are synchronized. For example, the client interworking unit is configured to determine whether or not the reception time points of the keep-alive message are synchronized, according to whether or not the number of the reception time points of the keep-alive message for the predetermined transmission period exceeds a threshold number (i.e., the threshold number is predefined). Hereinafter, for convenience of description, detecting whether or not the transmission time points when the client devices 400 transmit the keep-alive messages are synchronized will be described.

When the transmission time points of the keep-alive messages of the client devices 400 are synchronized, the client interworking unit 330 is configured to transmit keep-alive configuration messages to the client devices 400 to disperse the transmission time points.

A plurality of SP interworking units 310 or client interworking units 330 is provided according to the number of connections of the service providing devices 100 or the client devices 400 which connect with the interworking units 310 and 330. In general, since the number of terminals which the interworking units 310 and 330 can accommodate has been determined, the interworking units 310 and 330 are more installed based on the number.

The load balancing unit 340 is configured to receive status information from the SP interworking units 310 or the client interworking units 330 to calculate load information of the respective interworking units, and tabulate and store the calculated load information.

The controller 320 is configured to manage a plurality of SP interworking units 310 and client interworking units 330, and when receiving the push messages from the SP interworking units 310, extract the client interworking units 330, with which the corresponding client devices can connect, through client information included in the push messages, and transmit the push messages to the extracted client interworking units 330. Here, the controller 320 is configured to manage routing information for the client interworking units 330 with which the client devices can connect. The client interworking units 330 with which the client devices can connect refer to client interworking units with which the client devices maintain connection states.

Hereinafter, a process of balancing loads of keep-alive messages will be described in detail with reference to FIG. 5.

Figure 5:
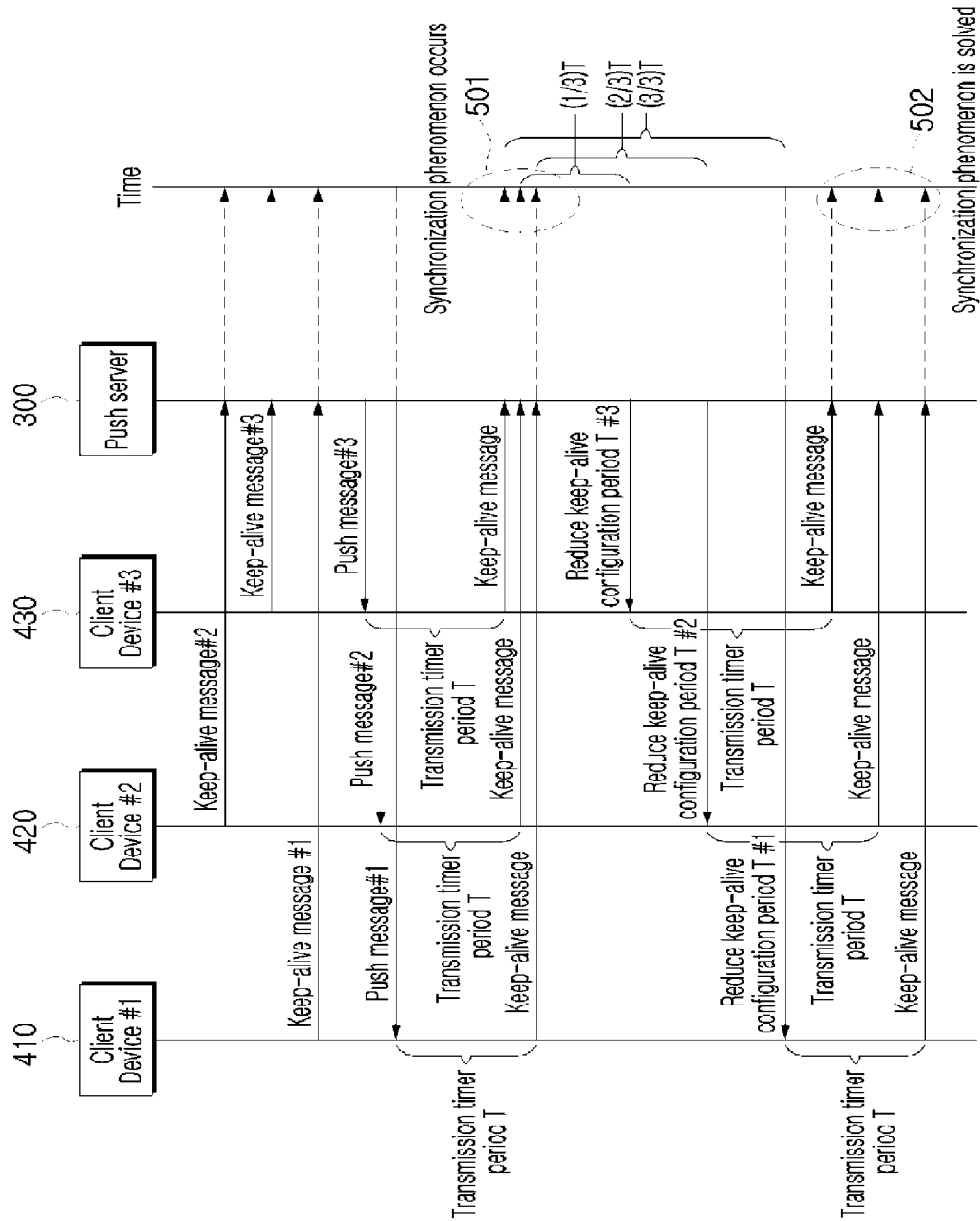
FIG. 5 is a signal flow diagram of a process of balancing loads of keep-alive messages according to at least one embodiment of the present disclosure.

FIG. 5 is a signal flow diagram illustrating a process of balancing loads of keep-alive messages according to at least one embodiment of the present disclosure.

As shown in FIG. 5, client device #1 410, client device #2 420, and client device #3 430 receive push messages #1, #2, and #3, respectively, and transmit keep-alive messages to a push service device 300 after transmission timer period T passes. Here, since the time points when client device #1 410, client device #2 420, and client device #3 430 are configured to receive push messages #1, #2, and #3, respectively, are concentrated on a specific time, a synchronization phenomenon 501 occurs in reception time points of keep-alive messages which the push service device 300 receives from client device #1 410, client device #2 420, and client device #3 430.

In order to solve the synchronization phenomenon, a client interworking unit 330 of the push service device 300 is configured to detect whether or not the synchronization phenomenon 501 occurs. In the case where the synchronization phenomenon 501 has occurred, the client interworking unit 330 is configured to transmit client configuration messages to client device #1 410, client device #2 420, and client device #3 430 such that time points when the keep-alive messages go into transmission are changed.

As an example, the client interworking unit 330 is configured to select an arbitrary value according to uniform distribution for a predetermined transmission period T of keep-alive messages. Here, the uniform distribution is calculated by the predetermined transmission period T of keep-alive messages and the number of sessions connected between the client interworking unit and the client devices. The client interworking unit 330 is configured to transmit keep-alive configuration messages to the corresponding client devices with delays for a selected period of time.

In more detail, in a case where a transmission timer period is T, and three client devices #1 410, #2 420 and #3 430 connect with the push service device 300, the push service device 300 sequentially transmits the keep-alive configuration messages to client devices #1 410, #2 420 and #3 430, respectively, while delaying transmission of the keep-alive configuration messages for each time of (1/3)T which is a value obtained by dividing the predetermined transmission period T by 3, that is, the number of the client devices.

That is, the client interworking unit 330 transmits the keep-alive configuration message to client #1 410 with a delay of (1/3)T, transmit the keep-alive configuration message to client #2 420 with a delay of (2/3)T, and transmit the keep-alive configuration message to client #3 430 with a delay of (3/3)T. Here, the keep-alive configuration message represents message in which start points of the transmission timer periods of the keep-alive messages are changed.

In a case in which client devices #1 410, #2 420, and #3 430 are formed on a zone-by-zone basis, the client interworking unit 330 is configured to transmit the keep-alive configuration messages on the zone-by-zone basis.

Thereafter, client devices #1 410, #2 420, and #3 430 initialize the transmission timer periods of the keep-alive messages, respectively, at different time points when client devices #1 410, #2 420, and #3 430 receive the keep-alive configuration messages.

Client devices #1 410, #2 420, and #3 430 transmit keep-alive messages to the push service device 300 according to the initialized transmission period T of the keep-alive messages after the transmission period T has passed, that is, at different time points. In other words, when receiving the keep-alive configuration message, each client initializes the transmission timer period, and transmits the keep-alive message to the push service device 300 at a time when the next transmission timer period T comes. Thus the synchronization phenomenon is solved as indicated by reference numeral 502 of FIG. 5.

As described above, since the keep-alive configuration messages are delayed for the transmission period T according to the uniform distribution, the time points when the respective client devices transmit the keep-alive messages are uniformly distributed for the transmission period T of the keep-alive messages. Thus burst traffic of a network due to the keep-alive messages is suppressed.

Figure 6:
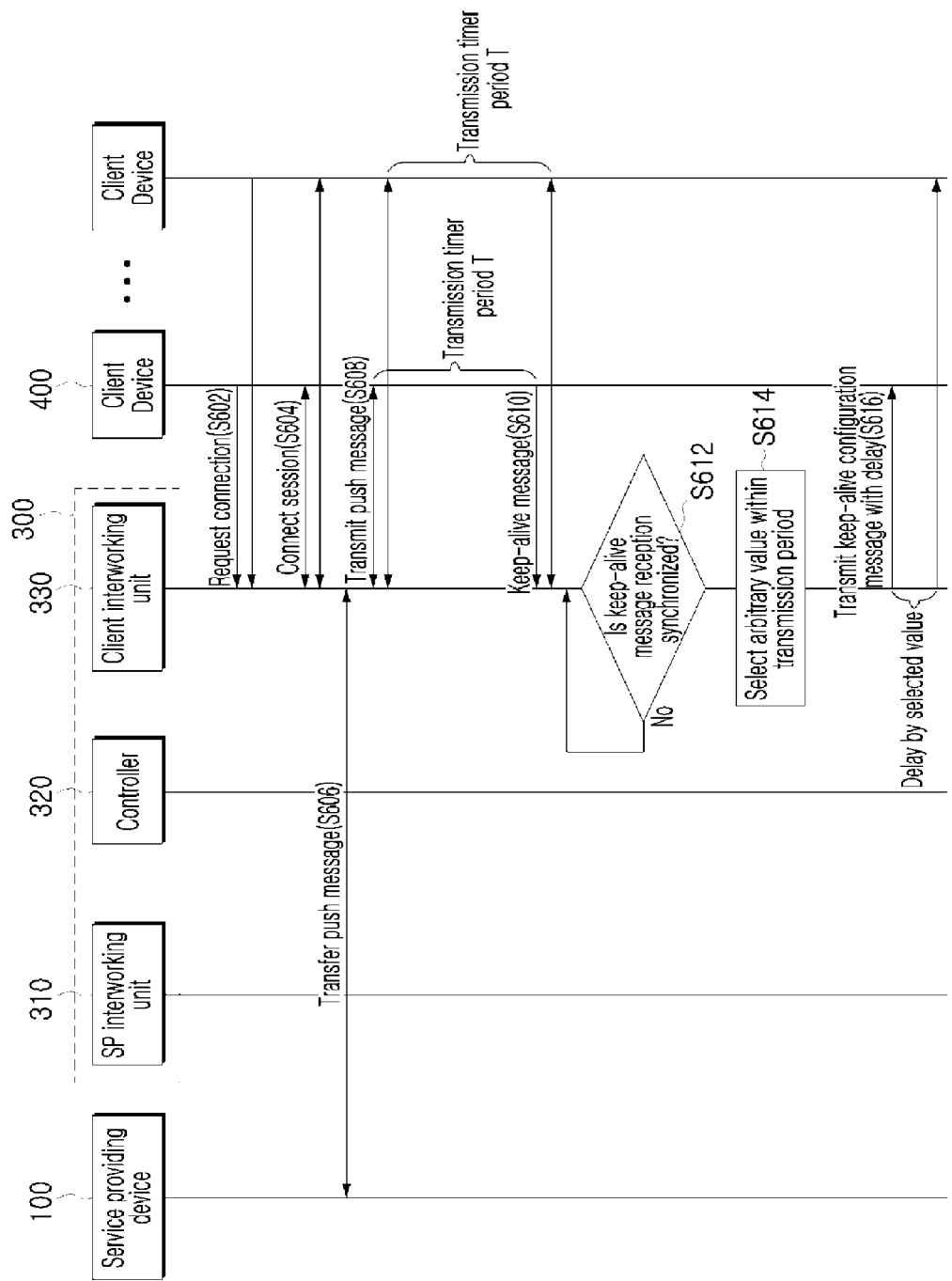
FIG. 6 is a signal flow diagram of a push service method for message load balancing according to at least one embodiment of the disclosure.

FIG. 6 is a flowchart illustrating a push service method for message load balancing according to at least one embodiment of the disclosure.

A plurality of client devices 400 attempt to connect with a client interworking unit 330 which can be connected (S602).

When the client interworking unit 330 transfers approval response messages to the client devices, sessions between the client devices 400 and a push service device 300 are connected through the client interworking unit 330 (S604).

A controller 320 transfers push messages received from service providing devices 100 through an SP interworking unit 310 to the client interworking unit 330 (S606).

The client interworking unit 330 transmits the push messages to the client devices 400 (S608).

When a transmission timer period T pass after the client interworking unit 330 transmits the push messages to the client devices 400, the client interworking unit 330 receives keep-alive messages from the client devices 400 (S610).

The client interworking unit 330 determines whether or not reception time points of the received keep-alive messages are synchronized with each other (S612).

When it is determined that the reception time points of the keep-alive messages synchronized with each other, the client interworking unit 330 selects an arbitrary value according to uniform distribution for a predetermined transmission period T of the keep-alive messages (S614). Here, the arbitrary value is a value through which the keep-alive messages are uniformly distributed without overlapping each other for the transmission period T of the keep-alive messages. For example, the selected value is a value which is equal to the predetermined transmission period T divided by the number of the client devices.

On the other hand, when it is determined that the reception time points of the keep-alive messages have not been synchronized with each other, the client interworking unit 330 is configured to continuously perform a process 612 of detecting the synchronization phenomenon.

The client interworking unit 330 sequentially delays keep-alive configuration messages by the selected time value in a process S614, and transmits the keep-alive configuration messages to the corresponding client devices (S616).

As described above, according to the present disclosure, when the reception time points of the keep-alive messages to maintain the connections between the push service device and the client devices are synchronized, the client interworking unit 330 detects the synchronization phenomenon to transmit the keep-alive configuration messages to balance the reception time points of the keep-alive messages to the client devices so that the keep-alive messages which the client devices transmit are uniformly distributed for the transmission period, which makes it possible to decrease burst traffic caused by the keep-alive messages.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although the various embodiments of the present disclosure has been described for illustrative purposes, those skilled in the art will appreciate that various modifications, additions and substitutions are possible, without departing from the scope and spirit of the claimed invention as disclosed in the accompanying claims. Accordingly, the present disclosure is not limited to the embodiments disclosed in the specification of the present disclosure. The scope of the present disclosure is to be determined by not only the following claims but also their equivalents. Specific terms used in this disclosure and drawings are used for illustrative purposes and not to be considered as limitations of the present disclosure.

What is claimed is:

1. A push service device for balancing message loads, comprising:
   a service provider (SP) interworking unit implemented by one or more processors, and configured to connect with a service providing device;
   a controller implemented by one or more processors, and configured to
      route a push message received from the service providing device through the SP interworking unit to one or more corresponding client devices; and
   a client interworking unit implemented by one or more processors, and configured to
      transmit the push message transferred from the controller to the one or more corresponding client devices,
      receive a keep-alive message from at least one of the one or more corresponding client devices, and
      transmit a keep-alive configuration message to the one or more corresponding client devices to disperse reception time points of the keep-alive message for a predetermined transmission period of the keep-alive message when the reception time points of the received keep-alive message are synchronized.

2. The push service device of claim 1, wherein the client interworking unit is configured to transmit the keep-alive configuration message to disperse the reception time points of the keep-alive message for the predetermined transmission period of the keep-alive message according to a uniform distribution.

3. The push service device of claim 1, wherein the client interworking unit is configured to transmit the keep-alive configuration message to the one or more corresponding client devices, while sequentially delaying the keep-alive configuration message by a time interval having a value obtained by dividing the predetermined transmission period of the keep-alive message by the number of the one or more corresponding client devices having synchronized reception time points of the keep-alive message.

4. The push service device of claim 1, wherein the client interworking unit is configured to generate the keep-alive configuration message including a time value initializing the transmission period of the keep-alive message.

5. The push service device of claim 1, wherein the client interworking unit is configured to determine whether or not the reception time points of the keep-alive message are synchronized, according to whether or not the number of the reception time points of the keep-alive message for the predetermined transmission period exceeds a threshold number.

6. The push service device of claim 1, wherein the controller is configured to manage one or more SP interworking units and the client interworking unit.

7. The push service device of claim 6, wherein when receiving the push message from the one or more SP interworking units, the controller is configured to
   extract the client interworking unit, with which the corresponding client devices are connectable, from client information included in the push message, and
   transmit the push message to the extracted client interworking unit.

8. The push service device of claim 1, wherein the controller is configured to manage routing information for the client interworking unit with which the client devices connect.

9. The push service device of claim 2, wherein the client interworking unit is configured to select an arbitrary value according to the uniform distribution for the predetermined transmission period of the keep-alive message.

10. The push service device of claim 9, wherein the uniform distribution is calculated by the predetermined transmission period of the keep-alive message and the number of sessions connected between the client interworking unit and the one or more corresponding client devices.

11. A method of providing a push service with balanced message loads, the method performed by a push service device and comprising:
    transmitting a push message received from a service providing device to one or more corresponding client devices;
    receiving a keep-alive message from the one or more corresponding client devices;
    determining whether or not reception time points of the received keep-alive message are synchronized; and
    transmitting a keep-alive configuration message to the one or more corresponding client devices to disperse the reception time points of the keep-alive message for a predetermined transmission period of the keep-alive message when the reception time points of the keep-alive message are synchronized.

12. The method of claim 11, wherein the transmitting of the keep-alive configuration message comprises:
    transmitting the keep-alive configuration message to disperse the reception time points of the keep-alive message for the predetermined transmission period of the keep-alive message according to a uniform distribution.

13. The method of claim 11, wherein the transmitting of the configuration message comprises:
    transmitting the keep-alive configuration message to the one or more corresponding client devices, while sequentially delaying the keep-alive configuration message by a time interval having a value obtained by dividing the predetermined transmission period of the keep-alive message by the number of the one or more corresponding client devices having synchronized reception time points of the keep-alive message.

14. The method of claim 11, further comprising:
    generating the keep-alive configuration message including a time value initializing the transmission period of the keep-alive message.

15. The method of claim 11, wherein the determining comprises:
    determining whether or not the reception time points of the keep-alive message are synchronized, according to whether or not the number of the reception time points of the keep-alive message for the predetermined transmission period exceeds a threshold number.

16. A method of providing a push service with balanced message loads in a client device, the method performed by the client device and comprising:
    periodically transmitting a keep-alive message to a push service device;
    receiving a keep-alive configuration message from the push service device to disperse transmission time points of the keep-alive message within a predetermined transmission period of the keep-alive message when the transmission time points of the transmitted keep-alive message are synchronized;
    initializing the transmission period timer of the keep-alive message according to reception of the keep-alive configuration message; and
    transmitting the keep-alive message to the push service device when a time limit of the initialized transmission period timer expires.

17. The method of claim 16, wherein the receiving of the keep-alive configuration message comprises:

receiving the keep-alive configuration message to disperse the transmission time points of the keep-alive message for the predetermined transmission period of the keep-alive message according to a uniform distribution.

\* \* \* \* \*